United States Patent
Funaki et al.

(10) Patent No.: US 7,078,470 B2
(45) Date of Patent: Jul. 18, 2006

(54) FLUOROCOPOLYMER

(75) Inventors: Atsushi Funaki, Chiba (JP); Naoko Sumi, Chiba (JP); Eiichi Nishi, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 83 days.

(21) Appl. No.: 10/601,671

(22) Filed: Jun. 24, 2003

(65) Prior Publication Data

US 2004/0001956 A1 Jan. 1, 2004

(30) Foreign Application Priority Data

| Jun. 27, 2002 | (JP) | ........................................ | 2002-188061 |
| Aug. 20, 2002 | (JP) | ........................................ | 2002-238811 |
| Jan. 21, 2003 | (JP) | ........................................ | 2003-011923 |

(51) Int. Cl.
C08F 214/18 (2006.01)
C08F 214/24 (2006.01)
C08F 214/26 (2006.01)
C08F 214/20 (2006.01)

(52) U.S. Cl. ...................... 526/242; 526/323; 526/317.1

(58) Field of Classification Search ................. 526/242, 526/323, 317.1
See application file for complete search history.

(56) References Cited

U.S. PATENT DOCUMENTS 3,445,434 A 5/1969 Stilmar

FOREIGN PATENT DOCUMENTS

| FR | 1 401 599 | | 4/1965 |
| FR | 1 460 137 | | 10/1966 |
| FR | 1460137 A | | 10/1966 |
| GB | 1072615 | * | 6/1967 |
| JP | 11-193312 | | 7/1999 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A fluorocopolymer which comprises (a) polymerized units based on tetrafluoroethylene and/or chlorotrifluoroethylene, (b) polymerized units based on a fluorinated monomer (excluding tetrafluoroethylene and chlorotrifluoroethylene) and (c) polymerized units based on at least one member selected from the group consisting of itaconic acid, itaconic anhydride, citraconic acid and citraconic anhydride, wherein (a) is from 50 to 99.8 mol %, (b) is from 0.1 to 49.99 mol %, and (c) is from 0.01 to 5 mol %, based on ((a)+(b)+(c)), and which has a volume flow rate of from 0.1 to 1000 mm$^3$/sec.

17 Claims, No Drawings

FLUOROCOPOLYMER

The present invention relates to a fluorocopolymer which is excellent in the chemical resistance, heat resistance, weather resistance and stress cracking resistance and which is also excellent in the adhesive properties to other materials such as synthetic resins, metals, metal oxides, glass or ceramics.

A fluoropolymer such as a polytetrafluoroethylene, a tetrafluoroethylene/perfluoro(alkyl vinyl ether) copolymer or an ethylene/tetrafluoroethylene copolymer, is used in various fields such as semiconductor industry and automobile industry.

The fluoropolymer is excellent in the heat resistance, chemical resistance, weather resistance and gas barrier properties, but its adhesive properties to other materials are not adequate. For example, in order to have it bonded to a synthetic resin, a metal, a metal oxide, glass, ceramics, etc., it is common to employ a method wherein the surface of the fluoropolymer is subjected to corona discharge treatment or sodium etching treatment, and then an adhesive is coated for bonding. In such a bonding method, the process is cumbersome, the productivity is low. Accordingly, it has been desired to develop a fluoropolymer which can be bonded to other materials by a simpler method.

As a method for forming a coating film of a fluoropolymer on the surface of a metal substrate, a method may, for example, be mentioned in which the surface is preliminarily roughened by e.g. sandblasting, then a primer is coated, and particles of a fluoropolymer are deposited thereon and then melted at a temperature of at least the melting point of the fluoropolymer. Also in such a case, it is desired to develop a fluoropolymer excellent in the adhesive properties to a metal, etc. without requiring a primer, with a view to reducing the cost and improving the productivity.

In recent years, a laminate of a fluoropolymer and a polyamide has been studied as a material for e.g. fuel tanks or fuel hoses for automobiles. In such a laminate, it is necessary that a layer of the fluoropolymer and a layer of the polyamide are firmly bonded to each other. As such a bonding method, a method is, for example, employed wherein a fluoropolymer tube is subjected to surface treatment by a method such as reagent treatment, corona discharge treatment or plasma discharge treatment to introduce various adhesive functional groups to the surface, then an adhesive is coated on such a tube, as the case requires, and then a polyamide is extruded and laminated on the outer surface of the fluoropolymer tube. However, in such a bonding method, the process is cumbersome, and the productivity of the laminate is low. Accordingly, it is desired to develop a fluoropolymer which will not require the surface treatment of the fluoropolymer layer and whereby it is possible to form a laminate from the fluoropolymer and a polyamide by a simple method such as a coextrusion method.

As such a fluoropolymer, JP-A-11-193312 discloses a fluorocopolymer containing polymerized units based on maleic anhydride. With the fluorocopolymer, the adhesive properties to other materials will be improved. However, copolymerizability of maleic anhydride with a fluorinated monomer is not sufficiently high, and it has been necessary to employ a special polymerization method for the production of the fluorocopolymer. By such a method, it has been difficult to sufficiently produce fluorocopolymers designed to meet various applications.

In an Example in U.K. Patent 1,087,999, a fluorocopolymer is disclosed which comprises polymerized units based on tetrafluoroethylene/polymerized units based on isobutylene/polymerized units based on vinyl benzoate/polymerized units based on itaconic acid. Such a copolymer is excellent in the adhesive properties to a metal, but the softening temperature is as low as 100° C., and the heat resistance was inadequate.

U.S. Pat. No. 3,445,434 discloses an ethylene/tetrafluoroethylene copolymer comprising polymerized units based on tetrafluoroethylene/polymerized units based on ethylene/polymerized units based on itaconic acid. However, with such an ethylene/tetrafluoroethylene copolymer, the heat resistance and the mechanical strength such as stress cracking resistance are not sufficient.

Under these circumstances, it is an object of the present invention to provide a fluorocopolymer which is excellent in the heat resistance, chemical resistance and weather resistance and which is also excellent in the adhesive properties to other materials.

The present invention provides a fluorocopolymer which comprises (a) polymerized units based on tetrafluoroethylene and/or chlorotrifluoroethylene, (b) polymerized units based on a fluorinated monomer (excluding tetrafluoroethylene and chlorotrifluoroethylene) and (c) polymerized units based on at least one member selected from the group consisting of itaconic acid, itaconic anhydride, citraconic acid and citraconic anhydride, wherein (a) is from 50 to 99.8 mol %, (b) is from 0.1 to 49.99 mol %, and (c) is from 0.01 to 5 mol %, based on ((a)+(b)+(c)), and which has a volume flow rate of from 0.1 to 1000 mm$^3$/sec.

Further, the present invention provides an article which comprises a substrate and a layer of the fluorocopolymer as defined above, formed on the surface of the substrate.

Now, the present invention will be described in detail with reference to the preferred embodiments.

The fluorocopolymer of the present invention comprises (a) polymerized units based on a tetrafluoroethylene (hereinafter referred to as TFE) and/or chlorotrifluoroethylene (hereinafter referred to as CTFE), (b) polymerized units based on a fluorinated monomer (excluding TFE and CTFE) and (c) polymerized units based on at least one member selected from the group consisting of itaconic acid (hereinafter referred to as IAC), itaconic anhydride (hereinafter referred to as IAH), citraconic acid (hereinafter referred to as CAC) and citraconic anhydride (hereinafter referred to as CAH).

In the fluorocopolymer of the present invention, (a) is from 50 to 99.8 mol %, (b) is from 0.1 to 49.99 mol %, and (c) is from 0.01 to 5 mol %, based on ((a)+(b)+(c)). Here, ((a)+(b)+(c)) represents the total of (a), (b) and (c).

Preferably, (a) is from 50 to 99 mol %, (b) is from 0.5 to 49.9 mol %, and (c) is from 0.1 to 3 mol %. More preferably, (a) is from 50 to 98 mol %, (b) is from 1 to 49.9 mol %, and (c) is from 0.1 to 2 mol %. When mol % of (a), (b) and (c) is within these ranges, the fluorocopolymer will be excellent in the heat resistance and chemical resistance. Further, if the molar ratio of (b) is within this range, the fluorocopolymer will be excellent in the processability and also excellent in the mechanical properties such as stress cracking resistance. When the molar ratio of (c) is within this range, the fluorocopolymer will be excellent in the adhesive properties to other materials.

The fluorinated monomer for (b) may, for example, be vinyl fluoride, vinylidene fluoride, trifluoroethylene, hexafluoropropylene, $CF_2=CFOR^1$ (wherein $R^1$ is a $C_{1-10}$ perfluoroalkyl group which may contain an oxygen atom), $CF_2=CFOR^2SO_2X^1$ (wherein $R^2$ is a $C_{1-10}$ perfluoroalkyl group which may contain an oxygen atom, and $X^1$ is a halogen atom or a hydroxyl group), $CF_2=CFOR^3CO_2X^2$ (wherein $R^3$ is a $C_{1-10}$ perfluoroalkyl group which may contain an oxygen atom, and $X^2$ is a hydrogen atom or an alkyl group having at most 3 carbon atoms), $CF_2=CF(CF_2)_POCF=CF_2$ (wherein P is 1 or 2), $CH_2=CX^3(CF_2)_QX^4$ (wherein $X^3$ is a hydrogen atom or a fluorine atom, Q is an integer of from 2 to 10, and $X^4$ is a hydrogen atom or a fluorine atom) and perfluoro(2-methylene-4-methyl-1,3-dioxolane).

It is preferably vinylidene fluoride, hexafluoropropylene, $CF_2=CFOR^1$ or $CH_2=CX^3(CF_2)_QX^4$, more preferably $CF_2=CFOR^1$ or $CH_2=CX^3(CF_2)_QX^4$.

$CF_2=CFOR^1$ may, for example, be $CF_2=CFOCF_2CF_3$, $CF_2=CFOCF_2CF_2CF_3$, $CF_2=CFOCF_2CF_2CF_2CF_3$, or $CF_2=CFO(CF_2)_8F$. It is preferably $CF_2=CFOCF_2CF_2CF_3$.

$CH_2=CX^3(CF_2)_QX^4$ may, for example, be $CH_2=CH(CF_2)_2F$, $CH_2=CH(CF_2)_3F$, $CH_2=CH(CF_2)_4F$, $CH_2=CF(CF_2)_3H$ or $CH_2=CF(CF_2)_4H$. It is preferably $CH_2=CH(CF_2)_4F$ or $CH_2=CH(CF_2)_2F$.

(c) is at least one type of polymerized units selected from the group consisting of IAC, IAH, CAC and CAH. More preferably, (c) is polymerized units based on IAH or CAH. Hereinafter, IAC, IAH, CAC and CAH will be generally referred to as an acid monomer.

If the acid monomer is used for the preparation of a fluorocopolymer, a fluorocopolymer having polymerized units based on the acid monomer can easily be prepared without necessity to employ a special polymerization method which is required in a case where maleic anhydride disclosed in JP-A-11-193312 is used, such being advantageous. If IAH or CAH is used for the preparation of a fluorocopolymer, a fluorocopolymer having polymerized units based on the acid anhydride, can easily be prepared.

In the fluorocopolymer of the present invention, ((a)+(b)+(c)) based on all polymerized units, is preferably at least 50 mol %, more preferably at least 55 mol %, most preferably at least 60 mol %.

It is preferred that the fluorocopolymer of the present invention further contains (d) polymerized units based on a non-fluorinated monomer in addition to (a), (b) and (c). The non-fluorinated monomer for (d) may, for example, be an olefin having at most three carbon atoms such as ethylene or propylene, a vinyl ester such as vinyl acetate, or a vinyl ether such as ethyl vinyl ether or cyclohexyl vinyl ether. It is preferably ethylene, propylene or vinyl acetate.

In a case where (d) is contained, the molar ratio of ((a)+(b)+(c))/(d) is preferably from 100/5 to 100/90, more preferably from 100/5 to 100/80, most preferably from 100/10 to 100/65.

The most preferred specific examples of the fluorocopolymer of the present invention include a TFE/$CF_2=CFOCF_2CF_2CF_3$/IAH copolymer, TFE/$CF_2=CFOCF_2CF_2CF_3$/CAH copolymer, a TFE/hexafluoropropylene/IAH copolymer, a TFE/hexafluoropropylene/CAH copolymer, a TFE/vinylidene fluoride/IAH copolymer, a TFE/vinylidene fluoride/CAH copolymer, a TFE/$CH_2=CH(CF_2)_4F$/IAH/ethylene copolymer, a TFE/$CH_2=CH(CF_2)_4F$/CAH/ethylene copolymer, a TFE/$CH_2=CH(CF_2)_2F$/IAH/ethylene copolymer, a TFE/$CH_2=CF(CF_2)_2F$/CAH/ethylene copolymer, a CTFE/$CH_2=CH(CF_2)_4F$/IAH/ethylene copolymer, a CTFE/$CH_2=CH(CF_2)_4F$/CAH/ethylene copolymer, a CTFE/$CH_2=CH(CF_2)_2F$/IAH/ethylene copolymer, and a CTFE/$CH_2=CH(CF_2)_2F$/CAH/ethylene copolymer.

When the fluorocopolymer of the present invention is laminated with a synthetic resin other than the fluorocopolymer, it is preferred to employ coextrusion. For the coextrusion, the fluorocopolymer preferably has a processing temperature close to the processing temperature of the synthetic resin. For this purpose, the proportions of (a), (b), (c) and, if necessary, (d) are optionally adjusted within the above-mentioned ranges to optimize the melting point of the fluorocopolymer.

It is also preferred that the fluorocopolymer of the present invention have functional groups such as ester groups, carbonate groups, hydroxyl groups, carboxyl groups, carbonylfluoride groups or acid anhydrides, as terminal groups, whereby the adhesive properties to other materials will be improved. It is preferred to introduce such terminal groups by properly selecting the radical polymerization initiator, the chain transfer agent, etc. to be used for the preparation of the fluorocopolymer.

The volume flow rate (hereinafter referred to as value Q) of the fluorocopolymer of the present invention is from 0.1 to 1,000 mm$^3$/sec. The value Q is an index for the melt flowability of the fluorocopolymer and may be used as a rough standard for the molecular weight. Namely, the larger the value Q, the lower the molecular weight, and the smaller the value Q, the higher the molecular weight. The value Q in the present invention is the extrusion rate of the fluorocopolymer when it is extruded through an orifice having a diameter of 2.1 mm and a length of 8 mm at a temperature higher by 50° C. than the melting point of the resin under a load of 7 kg, by means of a flow tester manufactured by Shimadzu Corporation. If the value Q is too small, the extrusion tends to be difficult, and if it is too large, the mechanical strength of the fluorocopolymer tends to decrease. The value Q of the fluorocopolymer of the present invention is preferably from 5 to 500 mm$^3$/sec, more preferably from 10 to 200 mm$^3$/sec.

The softening temperature of the fluorocopolymer of the present invention is preferably from 120 to 310° C., more preferably from 150 to 300° C., most preferably from 180 to 300° C. Here, the softening temperature is the adhesion temperature as disclosed in U.K. Patent 1,087,999 at page 7, lines 49 to 54, which is the lowest temperature at which a molten trace will be deposited on the fluorocopolymer when an overheated brass (copper/zinc alloy) block is contacted.

The method for producing the fluorocopolymer of the present invention is not particularly limited, and a polymerization method employing a radical polymerization initiator, may be used. As such a polymerization method, bulk polymerization, solution polymerization employing an organic solvent such as a fluorinated hydrocarbon, a chlorinated hydrocarbon, a fluorochlorinated hydrocarbon, an alcohol or a hydrocarbon, suspension polymerization employing an aqueous medium and, if necessary, a suitable organic solvent, or emulsion polymerization employing an aqueous medium and an emulsifier, may be mentioned. Particularly preferred is solution polymerization.

The radical polymerization initiator is preferably one such that the temperature for a half-life period of 10 hours is from 0° C. to 100° C., more preferably from 20 to 90° C. As a specific example, it may, for example, be an azo compound such as azobisisobutylonitrile, a non-fluorinated diacyl peroxide such as isobutyryl peroxide, octanoyl peroxide, benzoyl peroxide or lauroyl peroxide, a peroxy dicarbonate such as diisopropylperoxy dicarbonate, a peroxyester such as tert-butylperoxy pivalate, tert-butylperoxy isobutyrate, or tert-butylperoxy acetate, a fluorinated diacylperoxide such as a compound represented by $(Z(CF_2)_pCOO)_2$ (wherein Z is a hydrogen atom, a fluorine atom or a chlorine atom, and p is an integer of from 1 to 10), or an inorganic peroxide such as potassium persulfate, sodium persulfate or ammonium persulfate.

In the present invention, it is also preferred to use a chain transfer agent to control the value Q of the fluorocopolymer. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. Further, it is preferred to employ a chain transfer agent having a functional group such as an ester group, a carbonate group, a hydroxyl group, a carboxyl group or a carbonyl fluoride group, whereby a terminal group having a reactivity with a synthetic resin other than a fluoropolymer, such as a polyamide, can be introduced into the fluorocopolymer. As such a chain transfer agent, acetic acid, acetic anhydride, methyl acetate, ethylene glycol or propylene glycol may, for example, be mentioned.

In the present invention, the polymerization conditions are not particularly limited. The polymerization temperature is preferably from 0° C. to 100° C., more preferably from 20 to 90° C. The polymerization pressure is preferably from 0.1 to 10 MPa, more preferably from 0.5 to 3 MPa. The polymerization time is preferably from 1 to 30 hours.

The concentration of the acid monomer during the polymerization is preferably from 0.01 to 5%, more preferably from 0.1 to 3%, most preferably from 0.1 to 1%, based on the total monomers. If the concentration of the acid monomer is too high, the polymerization rate tends to be low. If it is within the above range, the polymerization rate during the production will not decrease, and the adhesive property of the fluorocopolymer will be excellent. It is preferred to supply the consumed amount continuously or intermittently during polymerization, as the acid monomer is consumed by polymerization, in order to maintain the concentration of the acid monomer within this range during the polymerization.

The article of the present invention comprises a substrate and a layer of the fluorocopolymer formed on the surface of the substrate.

The substrate may, for example, be a synthetic resin other than the above-mentioned fluoropolymer, a metal such as iron, stainless steel or aluminum, glass, or ceramics. As a method for coating the substrate, an electrostatic powder processing method, a rotational molding method, a thermal spray processing method, a fluidized immersion method, a dispersion method or a solvent casting method, may, for example, be employed.

In the electrostatic powder processing method, it is preferred that a negative high voltage is applied to a powder of the fluorocopolymer so that the powder is charged and attached to the surface of the substrate, and then the attached fluorocopolymer is heated and melted at a temperature higher than the melting point and lower than the decomposition point for from 5 minutes to one hour to form a coating film having a constant thickness.

In the rotational molding method, it is preferred that a powder of the fluorocopolymer is inserted into a can-shaped or cylindrical substrate, and the substrate is heated at a temperature higher than the melting point and lower than the decomposition point of the fluorocopolymer for from 5 minutes to one hour, while rotating the substrate, to melt the fluorocopolymer to form a coating film having a uniform thickness on the inner surface of the substrate.

In the thermal spray processing method, it is preferred to form a coating film by spraying the fluorocopolymer in a semimolten state to a preheated substrate by means of a powder thermal sprayer.

In the fluidized immersion method, it is preferred that a powder of the fluorocopolymer is put into a container having a bottom made of an air permeable porous plate, so that the powder is fluidized by sending a gas from the porous plate, and a substrate heated to a temperature higher than the melting point and lower than the decomposition point of the fluorocopolymer, is immersed in this fluidized layer for from one minute to one hour, to form a uniform coating film.

In the dispersion method, it is preferred that a fine powder of the fluorocopolymer is suspended or dispersed in water or a solvent, such a suspension or dispersion is sprayed on a substrate, and the water or solvent is evaporated to form a uniform layer of deposited powder, followed by heating and melting at a temperature higher than the melting point and lower than the decomposition point of the fluorocopolymer for from one minute to one hour to form a coating film.

In a case where the fluorocopolymer can be dissolved in a solvent, it can be coated on the surface of the substrate by casting, dipping or the like.

It is also preferred to have the surface of the substrate subjected to pretreatment. Such a pretreating method may, for example, be sandblasting treatment, phosphate treatment, hydrochloric acid treatment or sulfuric acid treatment. By such pretreatment, the adhesive properties between the substrate and the fluorocopolymer can be improved.

In the present invention, the article is preferably a laminate in which a layer of the fluorocopolymer of the present invention and a layer of a synthetic resin other than the fluorocopolymer, are directly laminated.

To obtain a laminate of the fluorocopolymer of the present invention and a synthetic resin other than the fluorocopolymer, a melt processing method may be employed. Among melt processing methods, a coextrusion method is advantageous and preferred from the viewpoint of the productivity. The coextrusion method is a method for obtaining a laminate of two or more layers in the form of a film or a tube. Melts discharged from the discharge openings of two or more extruders, will be in contact in a molten state and passed through a die, whereby they are formed into a laminate.

The extrusion temperature is adjusted depending upon the melting points and decomposition temperatures of the fluorocopolymer and the synthetic resin other than the fluorocopolymer. The screw temperature is preferably from 100 to 400° C., and the die temperature is preferably from 150 to 400° C. The screw rotational speed is not particularly limited, but it is preferably from 10 to 200 rpm. The retention time of the fluorocopolymer in the extruder is preferably from 1 to 20 minutes.

The synthetic resin other than the fluorocopolymer to be used for the coextrusion with the fluorocopolymer of the present invention may, for example, be a polyamide such as polyamide 6, polyamide 66, polyamide 46, polyamide 11, polyamide 12 or polyamide MXD6 (semiaromatic polyamide), a polyester such as polyethylene terephthalate, polybutylene terephthalate, polyethylene naphthalate or polybutylene naphthalate, polyethylene, poly(ethylene/VAC), polypropylene, polystyrene, polyvinylidene chloride, poly(VAC), polyvinyl alcohol, poly(ethylene/vinyl alcohol), polyacrylonitrile, polyoxymethylene, polyphenylene sulfide, polyphenylene ether, polycarbonate, polyamide imide, polyether imide, polysulfone or polyarylate.

As the synthetic resin other than the fluorocopolymer, a polyamide or a polyester is preferred, and polyamide 12 or polybutylene naphthalate is particularly preferred.

The laminate in the present invention is more preferably a laminate in which a layer of the fluorocopolymer and a layer of a polyamide are directly laminated.

The article comprising a substrate and a layer of the fluorocopolymer of the present invention formed on the surface of the substrate, is excellent in heat resistance, chemical resistance, corrosion resistance, oil resistance, weather resistance, abrasion resistance, lubricity, etc., and thus is useful for applications to e.g. reactors, containers or pipings for food products, medical use, semiconductors, chemical plants, etc., reagent transporting tanklorrys, shutterproof glass plates, shutterproof glass bottles, abrasion resistant ceramic components, etc.

Further, the fluorocopolymer of the present invention and the laminate of the fluorocopolymer and the synthetic resin other than the fluorocopolymer, are excellent in heat resistance, chemical resistance, corrosion resistance, oil resistance, weather resistance, etc., and thus are useful for automobile parts, industrial materials, electric and electronic parts, machine parts, parts for office equipments, household appliances, containers, sheets, films, fibers, monofilaments, and other various molded products of optional shapes and applications.

More specifically, tubes or hoses such as tubes or hoses for fuels for automobiles, fuel filler necks, cooling liquid hoses, brake hoses, air conditional hoses, tubes or hoses for fuel transportation, pipes for oil excavation, paint spray tubes, industrial hoses, or hoses for food products, films or sheets such as films for agricultural use, linings, interior materials for buildings (such as wall papers), or laminated steel plates, tanks such as tanks for automobile radiators, bottles for chemicals, tanks for chemicals, bags, containers for chemicals or tanks for automobile fuels, or adhesives, may be mentioned.

Now, the present invention will be described in further detail with reference to Examples (Examples 1 to 3 and 6) and Comparative Examples (Examples 4 and 5). However, it should be understood that the present invention is by no means restricted to such specific Examples. Here, the MIT folding endurance, and the content of IAH or CAH, were measured by the following methods.

MIT Folding Test

Measured in accordance with ASTM D2176. Namely, a test specimen having a width of 12.5 mm, a length of 130 mm and a thickness of 0.23 mm, was mounted on a MIT measuring meter, manufactured by Toyo Seiki Seisakusho, and the test specimen was folded under such conditions that the load was 1.25 kg, the folding angle to the left and to the right was 135°, and the number of folding times was 175 times/min, whereby the number of times until the test specimen broke was measured. This test is a test for resistance to fatigue from flexing, of the fluorocopolymer, and the measured value will be an index for cracking resistance. The larger the number of times, the better the cracking resistance.

Content of IAH or CAH

Fluorocopolymer (A) was press-molded to obtain a film having a thickness of 200 μm. In the infrared absorption spectrum, the absorption peak of the stretching vibration of C=O in the polymerized units based on IAH or CAH in the fluorocopolymer (A) appears at 1,870 $cm^{-1}$. The absorbance of such absorption peak was measured, and the content M (mol %) of polymerized units based on IAH or CAH was determined by the formula M=aL, wherein L is the absorbance at 1,870 $cm^{-1}$, and a is a coefficient. As a, a=0.87 was used, which was determined by using IAH as the model compound.

Softening Temperature

Measured in accordance with the disclosure in U.K. Patent 1,087,999 at page 7, lines 49–54. Namely, the softening temperature is the lowest temperature at which a molten trace deposits on the fluorocopolymer when a heated brass (copper/zinc alloy) block is contacted. It will be referred to also as an adhesion temperature.

EXAMPLE 1

A polymerization vessel having an internal capacity of 94 litter and equipped with a stirrer, was deaerated, and 71.3 kg of 1-hydrotridecafluorohexane, 20.4 kg of 1,3-dichloro-1,1, 2,2,3-pentafluoropropane (hereinafter referred to as AK225cb, manufactured by Asahi Glass Company, Limited), 562 g of $CH_2=CH(CF_2)_2F$ and 4.45 g of IAH were charged, and the temperature in the polymerization vessel was raised to 66° C. The pressure was raised to 1.5 MPa/G by a gas having a molar ratio of TFE/E of 89/11. As a polymerization initiator, 1 L of a 1-hydrotridecafluorohexane solution containing 0.7% of tert-butyl peroxypivalate, was charged to initiate the polymerization. A monomer mixture gas of TFE/E in a molar ratio of 59.5/40.5 was continuously charged so that the pressure would be constant during the polymerization. Further, $CH_2=CH(CF_2)_2F$ in an amount corresponding to 3.3 mol % and IAH in an amount corresponding to 0.8 mol %, based on the total molar amount of TFE and E charged during the polymerization, were continuously charged. Upon expiration of 9.9 hours from the initiation of the polymerization, and when 7.28 kg of the monomer mixture gas was charged, the internal temperature of the polymerization vessel was lowered to room temperature, and the vessel was purged to normal pressure.

The obtained fluorocopolymer 1 in a slurry form was put into a 200 L granulation vessel having 77 kg of water charged and then granulated with stirring, while distilling off the solvent by raising the temperature to 105° C. The obtained granules were dried at 150° C. for 15 hours to obtain 6.9 kg of granule 1 of fluorocopolymer 1.

From the results of the melt NMR analysis, the fluorine content analysis and the infrared absorption spectrum analysis, the composition of fluorocopolymer 1 was such that the molar ratio of polymerized units based on TFE/ polymerized units based on $CH_2=CH(CF_2)_2F$/polymerized units based on IAH/polymerized units based on E was 93.5/5.7/0.8/62.9. The melting point was 230° C., the softening temperature was 220° C., the value Q was 48 $mm^3$/sec., and the number of MIT folding times was 38900 times.

By means of an extruder, granule 1 was melt-kneaded at 260° C. for a retention time of 2 minutes to obtain pellets 1 of fluorocopolymer 1.

Polyamide 12 (3030JLX, manufactured by Ube Industries, Ltd.) was supplied to a cylinder for forming an outer layer, pellets 1 were supplied to a cylinder for forming an inner layer, and they were transported to the transport zones of the respective cylinders. The heating temperatures at the transport zones for polyamide 12 and pellets 1 were adjusted to be 240° C. and 260° C., respectively. By adjusting the temperature of the coextrusion die at 260° C., two layer coextrusion was carried out to obtain a two layer laminated tube. The laminated tube had an outer diameter of 8 mm, an inner diameter of 6 mm and a thickness of 1 mm, and the outer layer of polyamide 12 and the inner layer of fluorocopolymer 1 were 0.7 mm and 0.3 mm, respectively. The inner layer and the outer layer was firmly bonded to each other without peeling, and could not be peeled.

EXAMPLE 2

Granule 1 of fluorocopolymer 1 obtained in Example 1 was subjected to press molding at 300° C. to obtain a sheet having a thickness of 1 mm, a width of 2.5 cm and a length of 10 cm. This sheet was put on a SUS304 plate subjected to sandblast treatment and maintained at 260° C. for 20 minutes to melt fluorocopolymer 1 to form a coating film. During the forming, the coating film showed no color change and was found to be excellent in heat resistance. It was subjected to a peeling test, but the coating film broke, since the coating film of fluorocopolymer 1 and the SUS304 plate were firmly bonded.

A SUS304 plate having a coating film of fluorocopolymer 1 was immersed in concentrated hydrochloric acid at 100° C. for one week, whereupon a peel test was attempted, but the coating film was firmly bonded and could not be peeled.

Granule 1 was subjected to press molding at 300° C. to prepare a film having a thickness of 0.1 mm, which was subjected to an accelerated weather resistance test for 500 hours by a super UV tester, whereby no change on appearance was observed, and the film was found to be excellent in weather resistance.

EXAMPLE 3

The same polymerization vessel as used in Example 1 was deaerated, and 902 kg of AK225cb, 0.216 kg of methanol, 31.6 kg of $CF_3$=$CFOCF_2CF_2CF_3$ and 0.43 kg of IAH were charged. The temperature in the polymerization vessel was raised to 50° C., and TFE was charged until the pressure became 0.38 MPa. As a polymerization initiator solution, 50 mL of a 0.25% AK225cb solution of di(perfluorobutyryl) peroxide was charged to initiate the polymerization. TFE was continuously charged so that the pressure would be constant during the polymerization. The above polymerization initiator solution was optionally additionally added to maintain the charging rate of TFE substantially constant. The polymerization initiator solution was charged in a total amount of 120 mL. Further, IAH in an amount corresponding to 1 mol % of TFE continuously charged, was continuously charged. Upon expiration of 6 hours from the initiation of the polymerization and when 7.0 kg of TFE was charged, the internal temperature of the polymerization vessel was lowered to room temperature, and unreacted TFE was purged.

The obtained fluorocopolymer 2 in a slurry form was put into a 200 L granulation vessel having 75 kg of water charged and then granulated with stirring, while distilling off the solvent by raising the temperature to 105° C. The obtained granules were dried at 150° C. for 5 hours to obtain 7.5 kg of granule 2 of fluorocopolymer 2.

From the results of the melt NMR analysis, the fluorine content analysis and the infrared absorption spectrum analysis, the composition of fluorocopolymer 2 was such that the molar ratio of polymerized units based on TFE/polymerized units based on $CF_2$=$CFOCF_2CF_2CF_3$/polymerized units based on IAH was 97.7/2.0/0.3. The melting point was 292° C., the softening temperature was 280° C., the value Q was 15 mm$^3$/sec, and the number of MIT folding times was 46000 times.

Granule 2 of fluorocopolymer 2 was subjected to press molding at 340° C. to obtain a sheet having a thickness of 1 mm, a width of 2.5 cm and a length of 10 cm. This sheet was placed on a SUS304 plate subjected to sandblast treatment and maintained at 340° C. for 20 minutes to melt fluorocopolymer 2 to form a coating film. During the forming, the coating film showed no color change and was found to be excellent in heat resistance. A peel test was attempted, but the coating film of fluorocopolymer 2 and the SUS304 plates were firmly bonded, whereby the coating film broke.

A SUS304 plate having a coating film of fluorocopolymer 2, was immersed in concentrated hydrochloric acid at 100° C. for one week, whereupon a peel test was carried out, but the coating film of fluorocopolymer 2 and the SUS304 plate were firmly bonded and could not be peeled. Further, fluorocopolymer 2 was subjected to press molding at 340° C. to form a film having a thickness of 0.1 mm, and an accelerated weather resistance test was carried out for 500 hours by means of a super UV tester, whereby no change in outer appearance was observed, and the film was found to be excellent in weather resistance.

EXAMPLE 4

A coating film was formed on a SUS304 plate in the same manner as in Example 2 except that instead of granule 1, an ethylene/tetrafluoroethylene copolymer (Fluon ETFE LM2300N, manufactured by Asahi Glass Company, Limited) was used. As a result of a peel test, the peel strength between the coating film of Fluon ETFE LM2300N and the SUS304 plate was 10 N/cm, and the peel strength was inadequate.

EXAMPLE 5

The same polymerization vessel as used in Example 1, was deaerated, and 53.1 kg of 1-hydrotridecafluorohexane and 42.5 kg of AK225cb were charged. The temperature in the polymerization vessel was raised to 66° C., and a monomer mixture gas of TFE/E in a molar ratio of 89/11 was charged to raise the pressure to 1.5 MPa/G. As a polymerization initiator solution, 0.2 L of a 0.7% 1-hydrotridecafluorohexane solution of tert-butyl peroxypivalate was charged to initiate the polymerization. The monomer mixture gas of TFE/E in a molar ratio of 59.5/40.5 was continuously charged so that the pressure would be constant during the polymerization. Further, IAH in an amount corresponding to 0.8 mol % based on the total molar amount of TFE and E charged during the polymerization, was continuously charged. Upon expiration of 6.5 hours from the initiation of the polymerization, and when 7.28 kg of the monomer mixture gas was charged, the internal temperature of the polymerization vessel was lowered to room temperature, and the vessel was purged to normal pressure.

The obtained fluorocopolymer 3 in a slurry form was put into a 200 L granulation vessel having 77 kg of water charged and then granulated with stirring while distilling off the solvent by raising the temperature to 105° C. The obtained granules were dried at 150° C. for 15 hours to obtain 7.5 kg of granule 3 of fluorocopolymer 3.

From the results of the melt NMR analysis, the fluorine content analysis and the infrared absorption spectrum analysis, the composition of the fluorocopolymer 3 was such that the molar ratio of polymerized units based on TFE/polymerized units based on IAH/polymerized units based on E was 99.2/0.8/67.0. The melting point was 260° C., the softening temperature was 250° C., the value Q was 48 mm$^3$/sec, the number of MIT folding times was 4900 times, and the stress cracking resistance was inadequate.

EXAMPLE 6

Polybutylene naphthalate (PELPRENE EN-5000, manufactured by Toyobo Co., Ltd.) was supplied to a cylinder for forming an outer layer, pellets 1 of Example 1 were supplied to a cylinder for forming an inner layer, and they were transported to the transport zones of the respective cylinders. The heating temperatures at the transport zones for the polybutylene naphthalate and pellets 1 were adjusted to be 250° C. and 260° C. respectively. By adjusting the temperature of the coextrusion die at 260° C., two layer coextrusion was carried out to obtain a two layer laminated tube. The laminated tube had an outer diameter of 8 mm, an inner diameter of 6 mm and a thickness of 1 mm. The outer layer of polybutylene naphthalate and the inner layer of fluorocopolymer 1 were 0.7 mm and 0.3 mm, respectively. The inner layer and the outer layer were firmly bonded without peeling and could not be peeled.

As described in the foregoing, the fluorocopolymer of the present invention is excellent in the adhesive properties to substrates such as synthetic resins other than fluoropolymers, metals, metal oxides, glass or ceramics and is also excellent in heat resistance, chemical resistance, weather resistance and stress cracking resistance.

Further, the fluorocopolymer of the present invention is excellent in the adhesive properties to substrates such as metals, glass or ceramics, whereby an article comprising a substrate and a layer of the fluorocopolymer formed on the surface of the substrate, can be obtained without using a primer. Such an article is excellent in heat resistance, chemical resistance, corrosion resistance, oil resistance, weather resistance, abrasion resistance, lubricity, etc.

The fluorocopolymer of the present invention is excellent in coextrusion processability with a synthetic resin other than a fluoropolymer, whereby a layer of the fluorocopolymer and a layer of a synthetic resin other than the fluorocopolymer, can directly be laminated to present a laminate which is excellent in the adhesive properties between the layers.

The entire disclosures of Japanese Patent Application No. 2002-188061 filed on Jun. 27, 2002, Japanese Patent Application No. 2002-238811 filed on Aug. 20, 2002 and Japanese Patent Application No. 2003-11923 filed on Jan. 21, 2003 including specifications, claims and summaries are incorporated herein by reference in their entireties.

What is claimed is:

1. A fluorocopolymer which consists essentially of (a) polymerized units based on tetrafluoroethylene and/or chlorotrifluoroethylene, (b) polymerized units based on a fluorinated monomer, (excluding tetrafluoroethylene and chlorotrifluoroethylene), and (c) polymerized units based on at least one member selected from the group consisting of itaconic acid, itaconic anhydride, citraconic acid and citraconic anhydride, wherein (a) is from 50 to 99.8 mol %, (b) is from 0.1 to 80 mol %, and (c) is from 0.01 to 5 mol %, based on ((a)+(b)+(c)), and which has a volume flow rate of from 0.1 to 1000 mm3/sec.

2. The fluorocopolymer according to claim 1, which further contains (d) polymerized units based on a non-fluorinated monomer, wherein the molar ratio of ((a)+(b)+(c))/(d) is from 100/5 to 100/90.

3. The fluorocopolymer according to claim 2, wherein the non-fluorinated monomer is ethylene.

4. The fluorocopolymer according to claim 2, wherein the molar ratio of ((a)+(b)+(c))/(d) is from 100/10 to 100/65.

5. The fluorocopolymer according to claim 2, wherein said non-fluorinated monomer is ethyl vinyl ether, cyclohexyl vinyl ether, ethylene, propylene or vinyl acetate.

6. An article which comprises a substrate and a layer of the fluorocopolymer as defined in claim 1 formed on the surface of the substrate.

7. The article according to claim 6, which is a laminate wherein said layer of the fluorocopolymer and a layer of a synthetic resin other than said fluorocopolymer are directly laminated, provided that a multi-layer laminate hose having a fluorocopolymer layer and a polyamide resin layer directly laminated thereto, is excluded.

8. The article according to claim 6, wherein the substrate is a synthetic resin, metal, glass or ceramic.

9. The article according to claim 6, wherein the synthetic resin is polyamide 12 or polybutylene naphthalate.

10. A laminate which comprises a layer of the fluorocopolymer as defined in claim 1 and a layer of a polyamide are directly laminated, provided that a multi-layer laminate hose having a fluorocopolymer layer and a polyamide resin layer directly laminated thereto, is excluded.

11. The fluorocopolymer according to claim 1, wherein the fluorinated monomer is at least one member selected from the group consisting of vinylidene fluoride, hexafluoroethylene, $CF_2=CFOR^1$, (wherein $R^1$ is a $C_{1-10}$ perfluoroalkyl group which may contain an oxygen atom) and $CH_2=CX^3(CF_2)_QX^4$, (wherein $X^3$ is a hydrogen atom or a fluorine atom, Q is an integer of from 2 to 10, and $X^4$ is a hydrogen atom or a fluorine atom).

12. The fluorocopolymer according to claim 11, wherein said $CF_2=CFOR^1$ is $CF_2=CFOCF_2CF_2CF_3$.

13. The fluorocopolymer according to claim 11, wherein said $CH_2=CX^3(CF_2)_QX^4$ is $CH_2=CH(CF_2)_2F$ or $CH_2=CH(CF_2)_4F$.

14. The fluorocopolymer according to claim 1, wherein (a) is from 50 to 98 mol %, (b) is from 1 to 50 mol %, and (c) is from 0.1 to 2 mol %.

15. The fluorocopolymer according to claim 1, wherein said fluorinated monomer is vinylidene fluoride, hexafluoropropylene, $CF_2=CFF_2CCF_3$, $CF_2=CFOCF_2CF_2CF_3$, $CF_2=CFOCF_2CF_2CF_2CF_3$, $CF_2=CFO(CF_2)_8F$, $CH_2=CH(CF_2)_2F$, $CH_2=CH(CF_2)_3F$, $CH_2=CH(CF_2)_4F$, $CH_2=CF(CF_2)_3H$, $CH_2=CF(CF_2)_4H$, or perfluoro(2-methylene-4-methyl-1,3-dioxolane.

16. The fluorocopolymer according to claim 1, wherein the monomer in (c) is itaconic anhydride or citraconic anhydride.

17. The fluorocopolymer according to claim 1, wherein the volume flow rate is from 10 to 200 mm³/sec.

* * * * *